United States Patent
Osterlaenger et al.

(10) Patent No.: US 8,671,789 B2
(45) Date of Patent: Mar. 18, 2014

(54) BALL SCREW, IN PARTICULAR FOR A PARKING BRAKE OF A MOTOR

(75) Inventors: Juergen Osterlaenger, Emskirchen (DE); Stefanie Baerthlein, Baudenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 184 days.

(21) Appl. No.: 12/912,907

(22) Filed: Oct. 27, 2010

(65) Prior Publication Data

US 2011/0120247 A1 May 26, 2011

(30) Foreign Application Priority Data

Oct. 28, 2009 (DE) .................. 10 2009 051 123

(51) Int. Cl.
*F16H 27/02* (2006.01)
(52) U.S. Cl.
USPC ........................ 74/89.42; 188/72.8
(58) Field of Classification Search
USPC ............ 74/424.82, 424.88, 424.89, 424.95, 74/424.96, 89.4, 89.44, 89.42; 188/72.8, 188/71.9; 384/51
See application file for complete search history.

(56) References Cited

U.S. PATENT DOCUMENTS

| | | | | |
|---|---|---|---|---|
| 2,474,239 | A | * | 6/1949 | Flesch ........................ 188/207 |
| 2,770,155 | A | * | 11/1956 | Morgan ....................... 269/172 |
| 2,795,149 | A | * | 6/1957 | Morris ........................ 74/424.9 |
| 4,607,548 | A | * | 8/1986 | Anderson ....................... 81/427 |
| 4,669,594 | A | * | 6/1987 | Weissenberger et al. ....................... 192/213.22 |
| 4,721,190 | A | * | 1/1988 | Schmidt et al. .............. 188/71.9 |
| 4,809,824 | A | * | 3/1989 | Fargier et al. ............... 188/72.8 |
| 4,920,817 | A | * | 5/1990 | Granbom ..................... 74/424.9 |
| 6,158,557 | A | * | 12/2000 | Leitermann et al. ......... 188/71.8 |
| 6,439,072 | B1 | * | 8/2002 | Kajita et al. ................. 74/89.23 |
| 6,938,735 | B1 | * | 9/2005 | Hilzinger ..................... 188/72.1 |
| 7,771,307 | B2 | * | 8/2010 | Fujii ............................. 475/343 |
| 8,051,957 | B2 | * | 11/2011 | Giering et al. .............. 188/72.8 |
| 2006/0117887 | A1 | * | 6/2006 | Ohkubo et al. ............. 74/424.88 |
| 2009/0255752 | A1 | * | 10/2009 | Asakura et al. ................ 180/444 |
| 2009/0283371 | A1 | * | 11/2009 | Winkler et al. .............. 188/72.6 |

FOREIGN PATENT DOCUMENTS

| | | | |
|---|---|---|---|
| DE | 7640810 U1 | | 7/1977 |
| DE | 10 2008 051 350 A1 | | 4/2009 |
| DE | 10 2009 012 235 A1 | | 9/2009 |
| DE | 102009012235 | * | 9/2009 |
| WO | 2008/037738 A1 | | 4/2008 |
| WO | 2009/046899 A1 | | 4/2009 |

* cited by examiner

*Primary Examiner* — Troy Chambers
*Assistant Examiner* — Valentin Craciun
(74) *Attorney, Agent, or Firm* — Lucas & Mercanti, LLP

(57) ABSTRACT

A ball screw which has a threaded nut arranged on a threaded spindle, a helical ball channel in which balls are arranged delimited by ball grooves of the threaded spindle and the threaded nut, a ball cage which receives the balls and a spring element which bears with one end against the threaded nut and with another end against the ball cage. The spring element is arranged axially adjacent to the ball cage in an annular gap delimited by the threaded nut and the threaded spindle.

12 Claims, 4 Drawing Sheets

Figure 1:
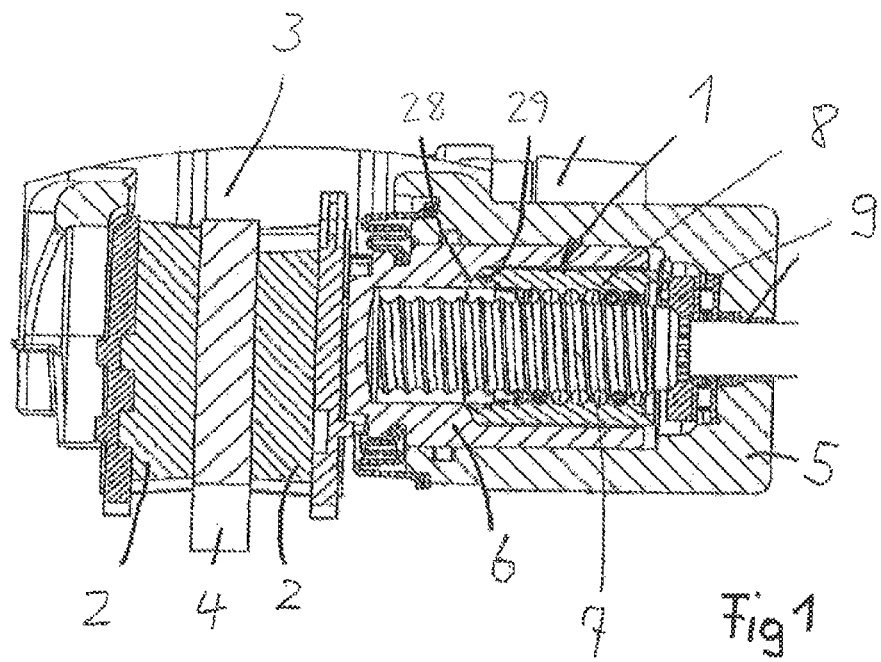

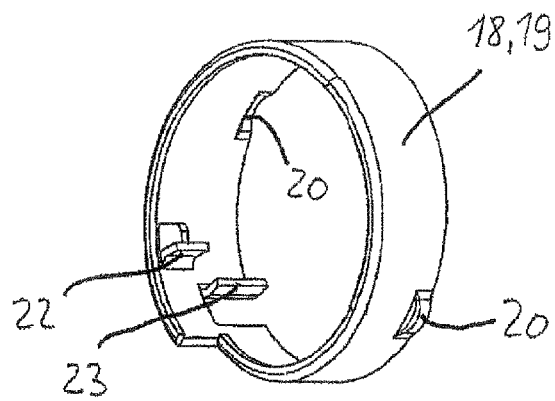 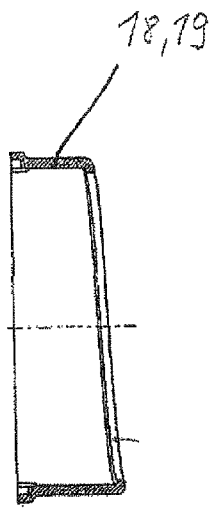 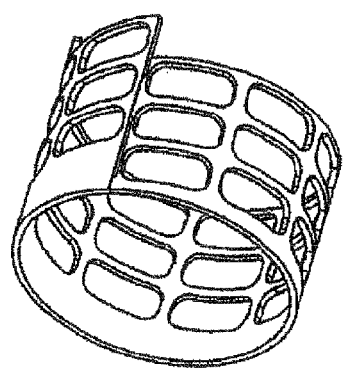 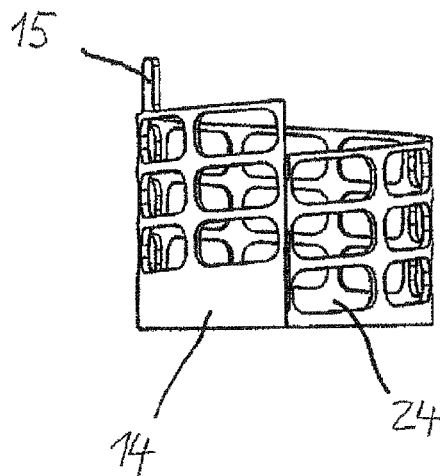
Fig 5
Fig 6
Fig 7
Fig 8

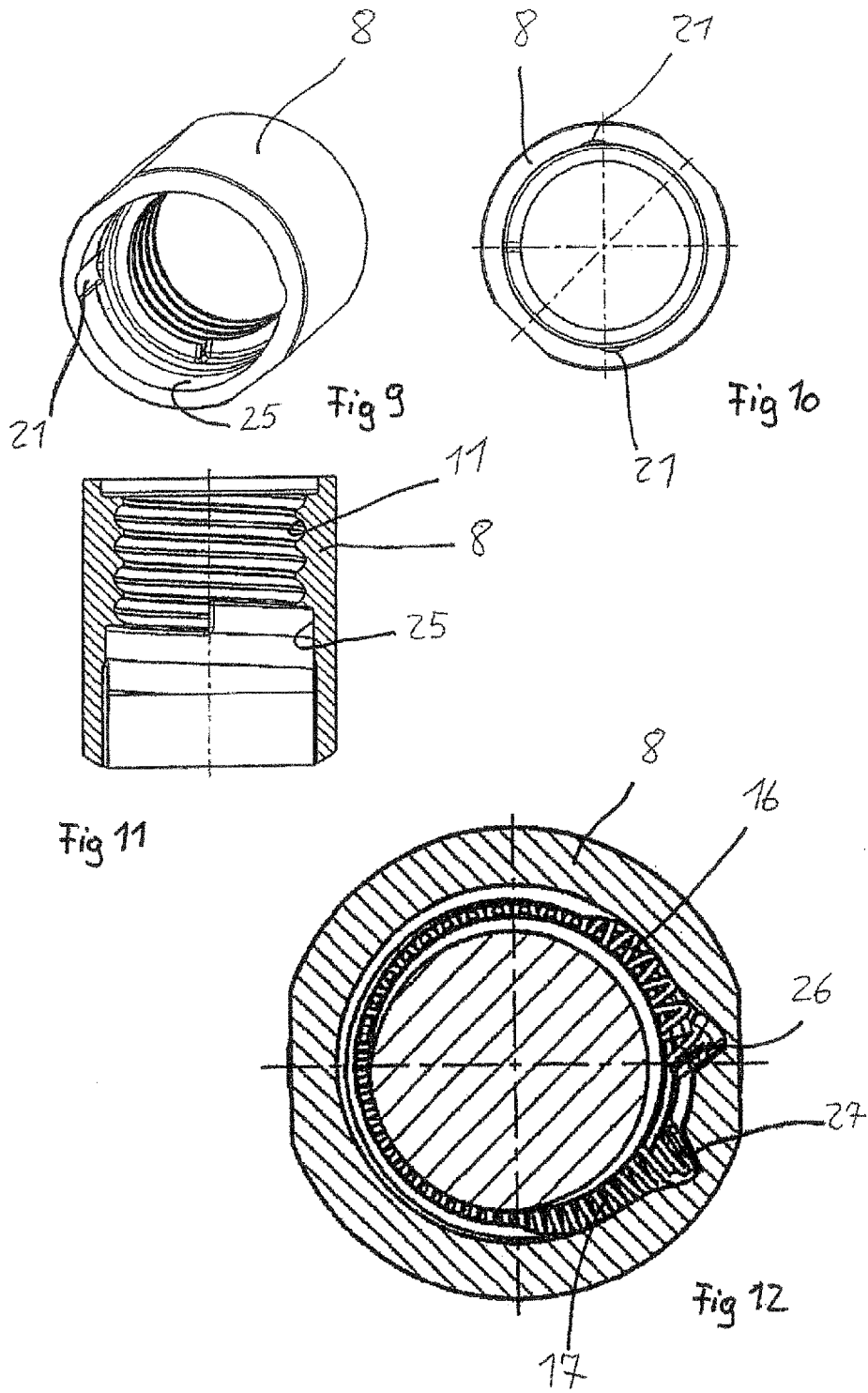

BALL SCREW, IN PARTICULAR FOR A PARKING BRAKE OF A MOTOR

This application claims the priority of DE 10 2009 051 123.7 filed Oct. 28, 2009, which is incorporated by reference herein.

The present invention relates to a ball screw. Ball screws convert a relative rotation between a threaded spindle and a threaded nut into a translational relative displacement between threaded spindle and threaded nut. The invention also relates to parking brakes of motor vehicles which are provided with such ball screws. For example, in this application the threaded nut can, upon rotation of the threaded nut, be displaced axially and pressed against a brake piston which in turn can press a brake pad against a brake disk.

A ball screw for an electromechanically actuatable motor vehicle brake is known, for example, from WO 2009/046899 A1. FIG. 20 of that document shows a ball screw with a threaded nut arranged on a threaded spindle. The threaded nut and the threaded spindle delimit with their ball grooves a ball channel wound helically around the longitudinal axis of the threaded spindle, in which channel balls are arranged.

The balls are received in ball pockets of a sleeve-shaped ball cage. The ball cage is provided with a plurality of ball pockets distributed around its circumference and arranged along the ball channel. The ball cage arranged coaxially with the threaded spindle extends over the full axial length of the threaded nut and projects far beyond one end of the threaded nut in the axial direction. A spring element in the form of a compression/torsion spring is arranged on this projecting part of the ball cage. This compression/torsion spring is formed by a spring wire wound helically around the longitudinal axis of the threaded spindle, one end of which spring wire is retained on the projecting part of the ball cage and the other end on the threaded nut.

With brakes of this type a small rotation of the cage can be sufficient to achieve a desired axial advance of the threaded nut. The compression/torsion spring ensures that, with the ball screw unloaded, the ball cage is displaced in the axial direction to a starting position. With the ball screw unloaded, the ball cage can be displaced along the ball channel with a screwing motion without relative rotation between the threaded nut and the threaded spindle, because the balls merely slide and do not roll on the ball grooves of the threaded spindle and the threaded nut.

A disadvantage of this ball screw can be its axial space requirement. In addition, upon insertion of the ball screw in a machine part, for example a brake piston, the exposed compression/torsion spring may be damaged, or a spring end may be levered out of a mounting position.

It is the object of the present invention to specify a ball screw according to the features of the preamble of claim 1 in which these disadvantages are avoided.

This object has been achieved according to the invention in that the spring element is arranged axially adjacent to the ball cage in an annular gap delimited by the threaded nut and the threaded spindle.

Both ends of the spring are preferably arranged within the axial extent of the ball nut.

In this ball screw according to the invention, the axial space requirement is considerably reduced. In addition, the ball screw can be installed in a machine part without risk of damage to the spring element.

The threaded nut can be produced economically in large volume in a non-cutting forming process. In a development according to the invention, it is provided that a support element retained on the threaded nut is provided in the annular gap, against which support element one end of the spring element bears. The support element may be inserted in the threaded nut and connected positively to the threaded nut. For a positive connection, a recess in the form of a small cavity, for example, may be formed in the inner circumference of the threaded nut, it being possible to form the projection by a bulge of the support element adapted to the cavity. The cavity provided in the threaded nut can be produced in a simple manner in a non-cutting forming process.

The support element is preferably in the form of a support ring which is provided with a support, particularly radially inward-projecting, as an abutment for one end of the spring element. Such support rings can also be produced in a non-cutting forming process. In this case deep-drawing, with which the radially inward-projecting support can also be simply formed, is especially suitable. In this way the support can be formed in a simple manner by an arm angled from the support ring and formed integrally therewith.

An especially advantageous development according to the invention provides that a further spring element is arranged in the annular gap, both spring elements being compressed and extending in mutually opposite spring directions and both spring elements bearing with one of their respective ends against the threaded nut and with their other end against the ball cage. This development according to the invention is especially suitable for the parking brakes of motor vehicles mentioned above. With the ball screw unloaded—so that the balls can slide in the ball channel without rolling on the ball grooves—the ball cage is in its starting position, in which both spring elements are unloaded or in an equilibrium of forces with one another. Should the ball cage be arranged outside its intended starting position, one of the two spring elements is loaded, for example in compression or in tension; as this spring force is relaxed, the ball cage is displaced to its starting position, with the ball screw unloaded.

The two spring elements are preferably each configured as so-called worm springs and arranged along the ball grooves. In this case the diameter of the worm spring is preferably smaller than the diameter of the ball channel. In a worm spring, the spring wire is wound helically around an axis.

The sleeve-shaped ball cage may be provided with a plurality of ball pockets distributed around its circumference and arranged along the ball channel, for receiving the balls. Depending on the loading of the ball screw, one or more balls may be arranged in each pocket. In a development according to the invention, a radial play from 20 μm to 200 μm of the balls in the ball channel may be provided in order to ensure that the balls can slide through the channel.

Figure 2:
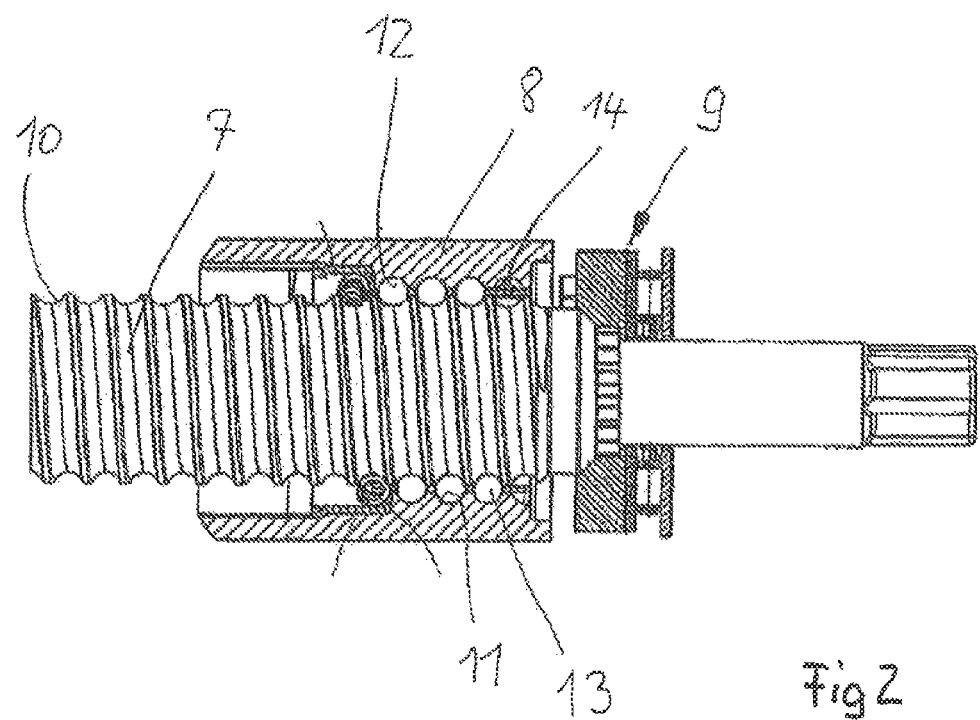
Figure 3:
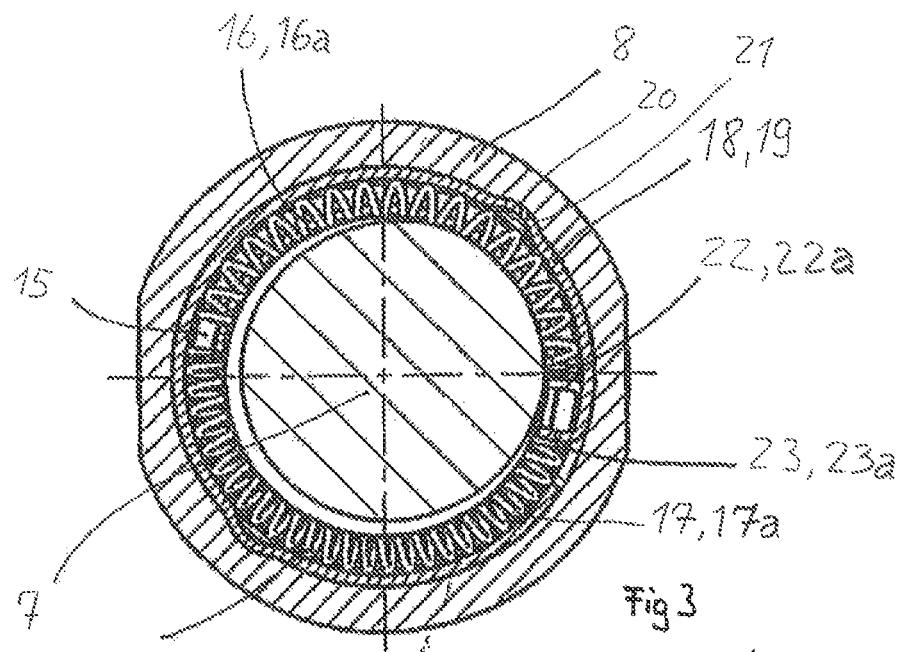
Figure 4:
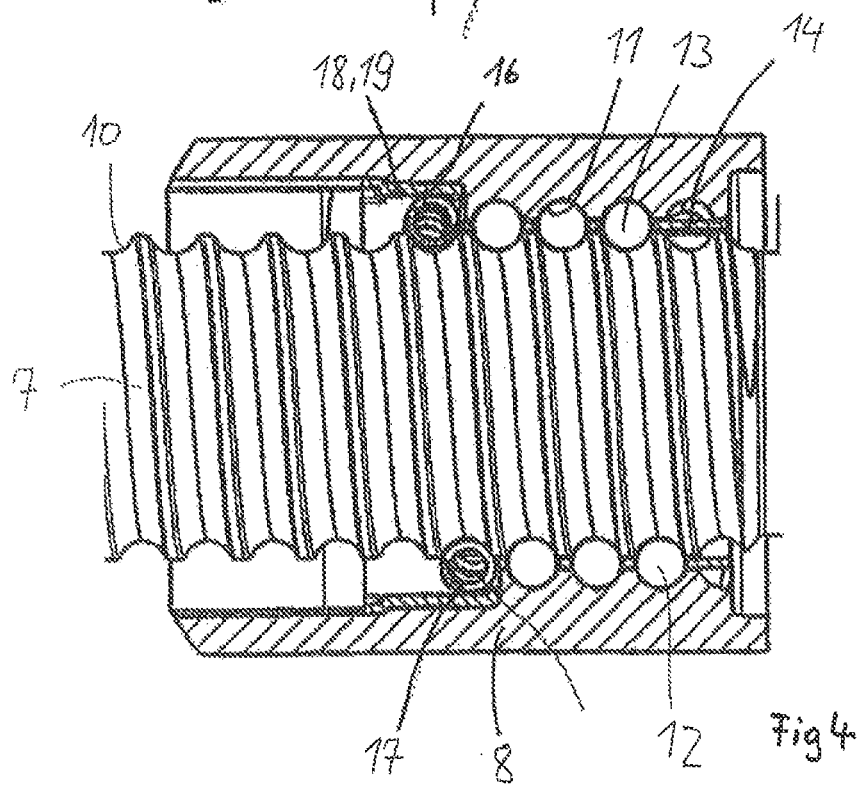

The invention is explained in more detail below with reference to two exemplary embodiments illustrated in a total of 12 figures, in which:

FIG. 1 shows a longitudinal section through a parking brake of a motor vehicle with ball screw according to the invention, FIG. 2 shows the ball screw of FIG. 1 on an enlarged scale and in longitudinal section, FIG. 3 shows a cross section through the ball screw of FIG. 2, FIG. 4 shows an enlarged detail from FIG. 2, FIG. 5 shows a support ring of the ball screw according to the invention in a perspective representation, FIG. 6 shows the support ring of FIG. 5 in longitudinal section, FIGS. 7 and 8 show a ball cage of the ball screw according to the invention in different perspective representations, FIG. 9 shows a threaded nut of the ball screw according to the invention in a perspective representation, FIG. 10 shows the threaded nut of FIG. 9 in a top view, FIG. 11 shows the threaded nut of FIG. 9 in longitudinal section, and FIG. 12 shows a further ball screw according to the invention in cross section.

FIG. 1 shows a service brake of a motor vehicle which is combined with a parking brake according to the invention, this parking brake being provided with a ball screw 1 according to the invention. A brake disk 4 is arranged in known fashion between two brake pads 2 of a brake caliper 3. A brake piston 6 is arranged in a housing 5. The brake piston 6 can be pressurized with hydraulic fluid and pressed along its piston axis in the direction of the brake pads 2. The brake disk 4 is clamped between the two brake pads upon actuation of the brake piston 6.

The ball screw 1 according to the invention is arranged in the hollow brake piston 6. The ball screw 1 comprises a threaded nut 8 arranged on a threaded spindle 7. For actuation of the parking brake, the threaded spindle 7 is set in rotation by means of a motor (not shown). Upon rotation of the threaded spindle 7, the threaded nut 8 is displaced axially with respect to the threaded spindle 7. The threaded nut 8 presses against the brake piston 6 and finally presses same against the adjacently arranged brake pad 2. The threaded spindle 7 is mounted axially in the housing 5 by means of an axial bearing 9. The axial pressure forces between the brake piston 6 and the threaded nut 8 are transmitted to the housing 5 via the threaded spindle 7 and the axial bearing 9.

FIG. 2 shows the inventive ball screw 1 in an enlarged representation. The threaded spindle 7 is provided with a ball groove 10 wound helically around the spindle axis. The threaded nut 8 is provided on its inner circumference with a ball groove 11 wound helically around the nut axis. The ball grooves 10 and 11 jointly delimit a helical ball channel 12, in which balls 13 are arranged. The balls 13 can roll on the ball grooves 10, 11. The balls 11 are received in a ball cage 14.

FIGS. 3 and 4 show the ball screw 1 of FIG. 2 in an enlarged representation, in cross section and in longitudinal section. The sleeve-shaped ball cage 14 has an axially projecting finger 15 at one of its axial ends.

Two spring elements 16a, 17a formed by worm springs 16, 17 and arranged along the ball groove 10 of the threaded spindle 7 are arranged in an annular gap delimited by the threaded spindle 7 and the threaded nut 8. Ends of the two worm springs 16, 17 oriented towards one another engage on the finger 15 of the ball cage 14, the finger 15 being arranged between these two ends of the two worm springs 16, 17. The respective other end of the two worm springs 16, 17 bears against a support element 18.

The support element 18 is formed by a support ring 19 arranged on the inner circumference of the threaded nut 8 and is connected positively and non-positively to the threaded nut 8. The support ring 19, produced from sheet metal in a non-cutting process, has a plurality of bulges 20 distributed over its circumference and engaging in adapted cavities 21 which are formed in the inner circumference of the threaded nut 8. The support ring 19 has two radially inward-projecting arms 22, 23 which are provided as supports 22a, 23a for the two worm springs 16, 17.

It can be seen from FIG. 3 that the other ends of the two worm springs 16, 17 bear against these arms 22, 23. In the present example, the two worm springs 16, 17 are in the form of compression springs and are compressed and extend in mutually opposite spring directions.

FIGS. 5 and 6 show the support ring 19 in a perspective representation and in longitudinal section. The radially inward-directed arms 22, 23 can be clearly seen in FIG. 5.

FIGS. 7 and 8 each show the ball cage 14 in perspective representation. It is apparent, in particular from FIG. 8, that the axially projecting finger 15 is formed integrally with the ball cage 14. The ball cage 14 is provided with a plurality of ball pockets 24 distributed over its circumference and arranged along the helical ball channel 12. In the present example, two balls 13 (not shown here) are arranged in each ball pocket 24. It is possible to vary the number of balls 13 in the ball pockets. For example, in developments according to the invention only a single ball may be arranged in one ball pocket; however, three balls may also be arranged in one ball pocket.

In the installed situation the support ring 18 and the ball cage 14 are arranged axially one behind the other. The end faces of the support ring 18 and of the ball cage 14 oriented towards one another are not level in a plane, but rather are formed along a helical line, the pitch of which corresponds to that of the ball channel 12. In the installed situation the end faces of the support ring 18 and of the ball cage 14 oriented towards one another are arranged parallel to one another. This configuration makes possible a number as large as possible of ball pockets 24 in the ball cage 14.

FIGS. 9, 10 and 11 show the threaded nut 8 in a perspective representation, in a top view and in longitudinal section. It is apparent, in particular from FIGS. 9 and 11, that a receptacle 25 for the support ring 19 (not shown here) is formed in the inner circumference of the threaded nut 8. The shape of this receptacle 25 matches the contour of the support ring 19.

FIG. 12 shows a further exemplary embodiment of a ball screw according to the invention, which differs from the exemplary embodiment described previously only in that the two worm springs 16, 17 bear directly against the threaded nut 8, a separate support element being omitted. To this end the threaded nut 8 is provided on its inner circumference with two circumferentially adjacent stop faces 26, 27. These stop faces 26, 27 are provided by suitable material recesses in the threaded nut 8. This development according to the invention is very robust and inexpensive to produce. Even when operating with a spring block, the spring stop cannot rotate in the nut.

Both the inventive ball screws illustrated here are provided with sufficient radial play for the balls in the ball channel, which radial play is set from approximately 20 μm to not more than 200 μm.

In both exemplary embodiments according to the invention, the spring elements in the form of worm springs ensure a correct starting position of the ball cage with the ball screw unloaded, as is explained in more detail below.

When the service brake is actuated, the hydraulically pressurized brake piston 6 presses against the brake pads 2, the brake piston 6 being displaced axially with respect to the threaded nut 8. If the driver now operates the parking brake, the threaded spindle 7 is set in rotation, the threaded nut 8 being displaced axially in the direction of the brake piston 6. During this phase the threaded nut 8 is free of load and the balls 13 slide along the ball channel 12. Relative rotation of the ball cage 14 with respect to the threaded nut 8 does not take place. Finally, the end face 29 of the threaded nut 8 abuts an end face 28 of the brake piston 6 and is loaded axially. Under this axial load the balls 13 are loaded and roll on the ball grooves 10, 11. The ball cage 14 now rotates relative to the threaded nut 8, the one worm spring 16 working as a restoring spring being compressed. Finally, the actuating travel of the threaded nut 8 is ended and the parking brake is activated.

When the parking brake is released again, the threaded nut 8 moves back. With the threaded nut 8 unloaded, the ball cage 14 is returned to its starting position as the compressed worm spring 16 relaxes.

The situation may arise that the service brake is activated with a very high braking effect during actuation of the parking brake. In that case the axial pressure force between the brake piston 6 and the threaded nut 8 resulting from the actuation of the parking brake is increased as soon as the hydraulic pressure of the service brake is removed. This is because, as the previously tensioned components are relaxed elastically—for example, the brake caliper may be elastically widened—the brake piston 6 presses with increased force against the threaded nut 8.

In the situation described previously, the balls 13 are in rolling contact with the ball grooves 10, 11 over a longer rolling distance during the release of the parking brake. First, the worm spring 16 working as a restoring spring relaxes. However, because the ball cage 14 is moved further as a result of an increased angle of rotation under load, the ball cage 14 lifts away from the worm spring 16. The intended starting position of the ball cage 14 is therefore not reached but overshot. The ball cage 14 now presses against the other worm spring 17, which works as a pre-stress spring. The ball cage 14 is moved relative to the threaded nut 8, while compressing the pre-stress spring, until the balls 13 are free of load. The ball cage 14, under the pressure of the pre-stress spring, is now moved in the direction of its intended starting position while the balls 13 slide through the ball channel until the pre-stress spring is unloaded or an equilibrium of forces is obtained between the two worm springs 16, 17. The ball cage 14 is now in its intended starting position.

The pre-stress spring is not absolutely necessary. Exemplary embodiments according to the invention in which only the restoring spring is provided are also possible. In all exemplary embodiments it is provided according to the invention that the ball cage and the spring element, preferably including the spring ends, are arranged within the axial extent of the threaded nut in the annular gap delimited by the threaded spindle and the threaded nut.

LIST OF REFERENCE NUMBERS

1 Ball screw
2 Brake pad
3 Brake caliper
4 Brake disk
5 Housing
6 Brake piston
7 Threaded spindle
8 Threaded nut
9 Axial bearing
10 Ball groove
11 Ball groove
12 Ball channel
13 Ball
14 Ball cage
15 Finger
16 Worm spring
16a Spring element
17 Worm spring
17a Spring element
18 Support element
19 Support ring
20 Bulge
21 Cavity
22 Arm
22a Support
23 Arm
23a Support
24 Ball pocket
25 Receptacle
26 Stop face
27 Stop face

The invention claimed is:

1. A ball screw, comprising:
a threaded nut arranged on a threaded spindle; and
a helical ball channel in which balls are arranged delimited by ball grooves of the threaded spindle and the threaded nut;
a ball cage receiving the balls;
a support element arranged in an annular gap delimited by the threaded nut and the threaded spindle and retained on the threaded nut;
a spring element which bears with one end against the support element, and with another end against the ball cage,
wherein the spring element is arranged axially adjacent to the ball cage and extends along the ball channel of the threaded spindle in the annular gap delimited by the threaded nut and the threaded spindle,
wherein the support element is a support ring with a radially inward projecting support as an abutment for the one spring end, and
wherein the support ring is produced from sheet metal in a forming process in which the support is formed by an arm angled from the support ring and formed integrally with the support ring from the sheet metal.

2. The ball screw according to claim 1, wherein the support element is retained positively with respect to rotation on an inner circumference of the threaded nut.

3. The ball screw according to claim 1, wherein a further spring element is arranged in the annular gap, the spring element and the further spring element are compressed and extend in mutually opposite spring directions, each bearing with one spring end against the threaded nut and with another spring end against the ball cage.

4. The ball screw according to claim 1, wherein the ball cage has a plurality of ball pockets for receiving the balls, which ball pockets are distributed around a circumference of the ball screw and arranged along the ball channel.

5. The ball screw according to claim 1, wherein a radial play from 20 μm to 200 μm of the balls in the ball channel is provided.

6. A parking brake of a motor vehicle, comprising:
a brake piston arranged displaceably along a piston axis in order to achieve a braking effect; and
a ball screw according to claim 1 for actuating the brake piston.

7. The parking brake of a motor vehicle according to claim 6, wherein the threaded nut and the brake piston have stop faces for abutting one against the other.

8. The ball screw according to claim 1, wherein the spring element is a worm spring.

9. The ball screw according to claim 1, wherein the ball cage includes an axial projection, and the another end of the spring element bears circumferentially against the axial projection.

10. The ball screw according to claim 3, wherein the spring element and the further spring element are worm springs extending along the ball groove of the ball groove of the threaded spindle.

11. The ball screw according to claim 3, wherein the ball cage includes an axial projection on one side of the ball cage, and the another end of the spring element and the further spring element bear on opposing sides of the axial projection.

12. A ball screw, comprising:
a threaded nut arranged on a threaded spindle; and
a helical ball channel in which balls are arranged delimited by ball grooves of the threaded spindle and the threaded nut;
a ball cage receiving the balls;
a support element arranged in an annular gap delimited by the threaded nut and the threaded spindle and retained on the threaded nut;
a spring element which bears with one end against the support element, and with another end against the ball cage, wherein the spring element is arranged axially adjacent to the ball cage and extends along the ball channel of the threaded spindle in the annular gap delimited by the threaded nut and the threaded spindle,
a further spring element arranged in the annular gap, the spring element and the further spring element being compressed and extend in mutually opposite spring directions, each bearing with one spring end against the threaded nut and with another spring end against the ball cage, and
wherein the ball cage includes an axial projection on one side of the ball cage, and the another end of the spring element and the further spring element bear on opposing sides of the axial projection.

* * * * *